UNITED STATES PATENT OFFICE.

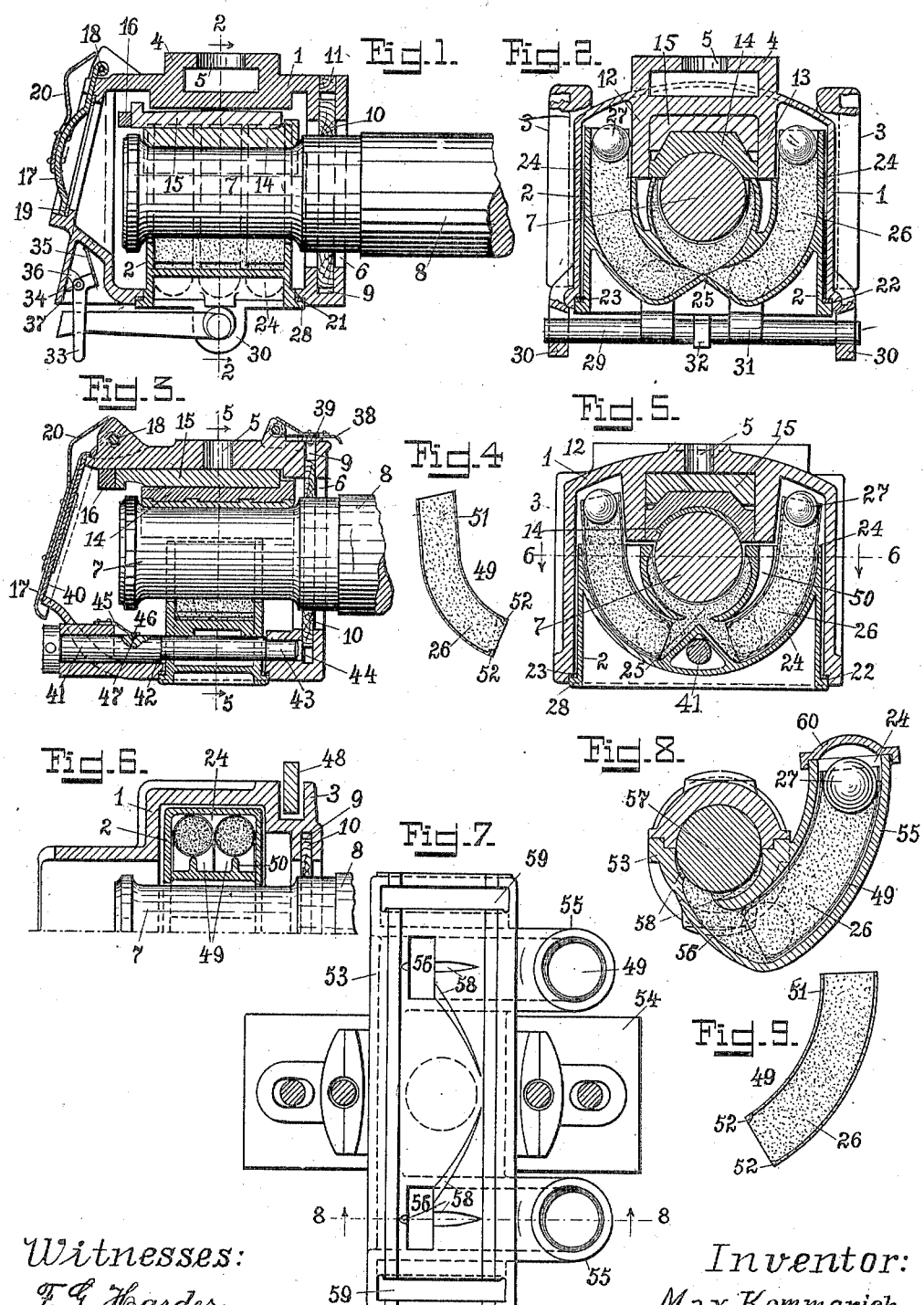

MAX KEMMERICH, OF AIX-LA-CHAPELLE, GERMANY.

BEARING WITH WEIGHT-CONTROLLED LUBRICANT.

No. 817,118.     Specification of Letters Patent.     Patented April 3, 1906.

Application filed September 7, 1905. Serial No. 277,365.

*To all whom it may concern:*

Be it known that I, MAX KEMMERICH, engineer, a subject of the King of Prussia, German Emperor, residing at No. 4 Maxstrasse, Aix-la-Chapelle, in the Kingdom of Prussia, Empire of Germany, have invented certain new and useful Improvements in Bearings with Weight-Controlled Lubricants; and I do hereby declare the following to be a full, clear, and exact description of the invention, such as will enable others skilled in the art to which it appertains to make and use the same.

My present invention relates to bearings, and particularly to that class thereof in which the lubricant is introduced into channels arranged sidewise of the journal or shaft to be lubricated and then uniformly pressed by weight into a chamber lying beneath said journal or shaft, thus pressing the lubricant against the uncovered part of the under side of the journal or shaft and keeping it continually in contact with a lubricant-cushion standing under a constant pressure.

In the accompanying drawings, Figure 1 is a longitudinal sectional view of a car-axle bearing constructed in accordance with this invention. Fig. 2 is a tranverse sectional view on the line 2 2 of Fig. 1. Fig. 3 is a longitudinal sectional view of a modification of the car-axle bearing shown in Figs. 1 and 2. Fig. 4 is a longitudinal sectional view of a lubricant-cartridge used in a car-axle bearing. Fig. 5 is a transverse sectional view on the line 5 5 of Fig. 3. Fig. 6 is one-half of a sectional view on the line 6 6 of Fig. 5. Fig. 7 is a plan view of a line-shaft bearing constructed in accordance with the present invention and of which the cap and the upper bearing-box have been removed. Fig. 8 is a transverse sectional view on the line 8 8 of Fig. 7. Fig. 9 is a longitudinal sectional view of a lubricant-cartridge as used in this line-shaft bearing.

The bearing shown in Figs. 1 and 2 chiefly consists of the main body or casing 1 and the lubrication-box or chambered lower bearing-box 2. The casing 1 is vertically guided by means of the lateral ribs 3, between which suitably-shaped guide-bars (not shown) are held. The top of the casing 1 is provided with a hollow projection 4, having an aperture 5, into which the pintle of the compound spring-clamp (not shown) enters. The rear of the casing 1 is provided with a large bore 6 for the admission of the journal 7 of the axle 8. To prevent dust from entering the casing 1 by way of the bore 6 when the journal 7 is in place, a recess 9 is provided, into which a wooden dust-guard 10 is inserted. An accumulation of dust and dirt upon the dust-guard is prevented by inserting a wooden plug 11 in the top of the recess 9, which is made large enough to give the dust-guard sufficient radial play.

Between the vertical walls 12 and 13 of the casing 1 the bearing-box 14 is guided sidewise, whereas endwise it is held by the shoulders of the journal 7. To transmit the pressure caused by the load uniformly to that part of the casing 1 which lies below the aperture 5, a filling-block 15 is provided whose top is rounded off, as shown in Fig. 1. To keep this filling-block from moving outwardly, a square bolt 16 is arranged in front of it and held in the side walls of the casing 1.

The outer end of the casing 1 is provided with a door 17, hinged at 18 and held against the gasket 19 by a flat spring 20. By means of this door access can be had to the interior of the casing for inspection or other purposes.

The bottom of the casing 1 is provided with a rectangular opening 21, surrounded by a recess 22 for the reception of the gasket 23. Through this opening the lubrication-box 2, containing channels 24, arranged at both sides of the journal, and a central chamber 25, with which said channels communicate, is introduced after said channels have been filled with a lubricant 26 and after the weights 27 have been put on top of the lubricant. The number of channels will of course vary from case to case to suit the length of the journal to be lubricated and may be arranged at one or at both sides of the central chamber 25, as circumstances may direct. The lubricant employed is a consistent fat. When the lubrication-box has been introduced into the opening 21, it is pressed upward until its flanges 28 come into contact with the gasket 23, after which it is finally pressed against said gasket by a shaft 29, supported in slotted lugs 30, and provided with eccentric shoulders 31. To rotate this shaft 29, it is provided with an arm 32, which is held in working position by an eye-latch 33, hinged at 34 to the casing 1. To retain this eye-latch in the desired position, it is provided with a flat spring 35, bearing against the front wall of the casing 1, and with a nose 36, bearing against the apron 37. To remove the box 2, it is only necessary to draw the latch 33 forward, slide the shaft 29 in one direction until one of its ends clears the lug generally supporting it, and then move the shaft in the opposite direction until the other end of the shaft is clearing the other lug 30.

When all parts are in position, the weights 27 will gradually press the lubricant into the central chamber 25, wherein it will duly come into contact with the under side of the journal 7. In the same proportion the lubricant is consumed the weights 27 will replace it by new portions of the lubricant, and thus keep the journal uninterruptedly in contact with a steadily upward pressed lubricant-cushion.

The car-axle bearing shown in Figs. 3 to 6, inclusive, is principally differing from the above-described bearing in minor details of construction and by the fact that the lubricant is not inserted into the channels 24 directly, but in shape of cartridges.

In Fig. 3 the recess 9, containing the dust-guard 10, is closed by a spring-actuated cover 38, faced with a dust-pad 39, whereas the door 17 is made hollow and likewise faced with a dust-pad 40 to replace the gasket 19. (Shown in Fig. 1.) To secure the lubrication-box 2, an eccentric locking-pin 41 is employed instead of the shaft 29. (Shown in Figs. 1 and 2.) When the lubrication-box 2 has been inserted into the opening 21, the locking-pin 41 is pushed into place, with its shoulder 42 on top, until the pintle 43 has entered the bore 44 of the casing 1. This done, the locking-pin 41 is rotated until the shoulder 42 takes up the position shown in Fig. 3, whereby the lubrication-box 2 is secured in its working position. The locking-pin 41 is held in position by the spring-catch 45, whose projection 46 enters a depression 47 of the pin 41. Other differences are that the bearing-box 14 is lined with Babbitt metal and that the aperture 5 communicates with the interior of the casing 1. Fig. 6 shows how the casing 1 is guided by guide-bars 48.

For the reason that here the lubricant is employed in shape of cartridges 49 the channels 24 of the lubrication-box are not kept apart by division-walls, as indicated in Fig. 1, but form one common chamber in which the cartridges are placed side by side and held in position by ribs 50. To better guide the lubricant standing under the influence of the weights 27 and to prevent the cartridges from sinking too deep into the central chamber 4, the lower ends of the channels are gently curved and at the same time drawn in, as shown in Figs. 2 and 5. In operation this bearing is acting similarly to the bearing described above, the only difference being that the weights 27 are sliding down within the cartridge-mantle 51 instead of in the channel directly.

The mantle of the cartridge may be made of tin. The lower end of the cartridge-mantle is provided with indentations or inward projections 52 to prevent the weight from leaving the mantle, and thus simplify the removal of the weight. The mantle 51 can be easily removed, since it projects over the top of the lubrication-box. Cartridge-mantles and weights are removed before new cartridges are inserted.

The advantages shown by this modified bearing over the first-named bearing are residing in the facts that the cartridges can be inserted far quicker and more conveniently than a lubricant, which must be filled into the several channels 24, and that the lubricant contained in a cartridge can be more uniformly compressed by suitable means independent of the bearing than the lubricant introduced into the channels 24 by hand, whereby the pressure exerted is never alike, for which reason layers of different densities are created which cause an uneven lubrication. This improvement is of the greatest importance when an axle becomes heated during a run, as the removal of the empty mantles and the insertion of new cartridges can be accomplished within a few minutes.

In Figs. 7 and 8 a self-adjusting line-shaft bearing is shown in which the lower journal-box 53 is provided at both sides of the base 54 with a uniformly-curved tubular casing 55 to permit, on the one hand, a convenient insertion of cartridges 49, struck with the same radius as the casing 55, and, on the other hand, an easy removal of the empty cartridge-mantle. The channel 24 of each casing 55 is gradually curved upward and reduced at its lower end. The contracted chamber 56 thus formed pierces the bearing-surface of the lower bearing-box 53 beneath the shaft 57. The lubricant 26 is pressed by the weight 27 into the grooves 58, corresponding to the upper branches of the central chamber 25 of Figs. 2 and 5. The ends of the lower bearing-box 53 are provided with recesses 59 to collect the used lubricant. After the cartridges have been inserted the weights 27 are placed thereon and the caps 60 put on the casings 55. As soon as the shaft 57 is rotated and the lubricant consumed the weights 27 slowly sink within the cartridge-mantles 51, and thus keep the under side of the shaft 57 constantly in contact with a steadily upward pressed lubricant-cushion.

The attachment of the tubular casings 55 to the lower bearing-box 53 and their arrangement at one side of the shaft 57 and at both sides of the base 54 permits not only the most reasonable lubrication of the shaft where the pressure really exists, but also offers the best means for a convenient and rapid renewal of the cartridges.

I claim—

1. A bearing having a lower bearing-box provided with a chamber arranged beneath the journal or shaft to be lubricated and communicating with said journal or shaft, channels for the reception of the lubricant arranged sidewise of said journal or shaft and communicating at their lower upward-sloping end with said chamber, and an independent weight in each lateral channel for automatically ejecting the lubricant from the channel containing it and pressing it into and through said chamber upward against the under side of said journal or shaft.

2. In a bearing the combination with the journal or shaft to be lubricated of a lower bearing-box having a chamber communicating with the under side of said journal or shaft, channels for the reception of the lubricant arranged sidewise of said journal or shaft and communicating at their lower upward-sloping end with said chamber, and an independent weight in each channel to eject the lubricant contained therein and press it into and through said chamber upward against the under side of said journal or shaft.

3. In a bearing the combination with the journal or shaft to be lubricated of a lower bearing-box having a chamber communicating with the under side of said journal or shaft, channels arranged sidewise of said journal or shaft and communicating at their lower upward-sloping end with said chamber, an exchangeable lubricant cartridge in each channel, and an independent weight on each lubricant-cartridge to eject the lubricant from the cartridge-mantle and press it into and through said chamber upward against the under side of said journal or shaft.

4. In a bearing the combination with the lower bearing-box having a chamber communicating with the under side of the journal or shaft to be lubricated and channels for the reception of the lubricant arranged laterally of said journal or shaft and communicating at their lower upward-sloping end with said chamber, of a casing containing and guiding said lower bearing-box, and an eccentric locking-pin held in its locking position by a spring-catch.

5. As a new article of manufacture a lubricant-cartridge comprising a curved tubular metallic mantle, inwardly-pointing projections at the lower end of said mantle, and a lubricant held by said mantle.

In testimony whereof I have signed my name to this specification in the presence of two subscribing witnesses.

MAX KEMMERICH.

Witnesses:
FRANK SEGERS,
ALEXANDER SCHUTZ,